United States Patent [19]

Morehouse et al.

[11] Patent Number: 5,768,049
[45] Date of Patent: Jun. 16, 1998

[54] DISK DRIVE APPARATUS

[75] Inventors: James H. Morehouse, Jamestown;
John H. Blagaila; James A. Dunckley,
both of Boulder, all of Colo.

[73] Assignee: Integral Peripherals, Inc., Boulder,
Colo.

[21] Appl. No.: 695,739

[22] Filed: Aug. 12, 1996

Related U.S. Application Data

[63] Continuation of Ser. No. 270,694, Jul. 5, 1994, abandoned.

[51] Int. Cl.$^6$ .......................... G11B 5/012; G11B 17/00; G11B 33/14
[52] U.S. Cl. ........................ 360/97.01; 360/97.02
[58] Field of Search ............... 360/97.01, 99.08, 360/903, 97.02

[56] References Cited

U.S. PATENT DOCUMENTS

| | | | |
|---|---|---|---|
| 4,908,715 | 3/1990 | Krum et al. | 360/97.02 |
| 5,098,175 | 3/1992 | Cooke et al. | 312/341.1 |
| 5,179,482 | 1/1993 | Tanaka et al. | 360/97.01 |
| 5,204,794 | 4/1993 | Yoshida | 360/133 |
| 5,272,580 | 12/1993 | Hickox et al. | 360/97.02 |
| 5,282,099 | 1/1994 | Kawagoe et al. | 360/97.01 |
| 5,377,065 | 12/1994 | Morehouse et al. | 360/105 |
| 5,396,384 | 3/1995 | Caldeira et al. | 360/97.01 |
| 5,406,431 | 4/1995 | Beecroft | 360/97.02 |
| 5,414,574 | 5/1995 | Boutaghou et al. | 360/97.01 |
| 5,420,733 | 5/1995 | Knighton et al. | 360/97.01 |

OTHER PUBLICATIONS

Single page entitled "Type III", (exact origin unknown).
Single page entitled "Type 4", (exact origin unknown).
Single page entitled "Type-5", (exact origin unknown).
Henry W. Ott, "Noise Reduction Techniques In Electronic Systems", 2nd Edition, John Wiley & Sons, 1936, pp. 188–191.
"PC Card Standard", Release 2.0, Personal Computer Memory Card International Association (PCMCIA), Sep. 1991, 42 pages.
PCMCIA Technical Committee Meeting Minutes, Santa Clara, CA, May 6–7 1992, 18 pages.
"PCMCIA Standards", Release 2, Personal Computer Memory Card International Association (PCMCIA), Nov. 1992.

*Primary Examiner*—Tom Thomas
*Assistant Examiner*—Adriana Giordana
*Attorney, Agent, or Firm*—Skjerven, Morrill, MacPherson, Franklin & Friel LLP; Forrest E. Gunnison

[57] ABSTRACT

A disk drive apparatus, by using an integrated base structure made up of a base portion and a printed circuit board, and an integrated cover structure made up of a cover casting and a printed circuit board, is able to achieve an overall thickness of 5 millimeters, so that such disk drive apparatus can meet the current PCMCIA card standard for Type II cards.

8 Claims, 9 Drawing Sheets

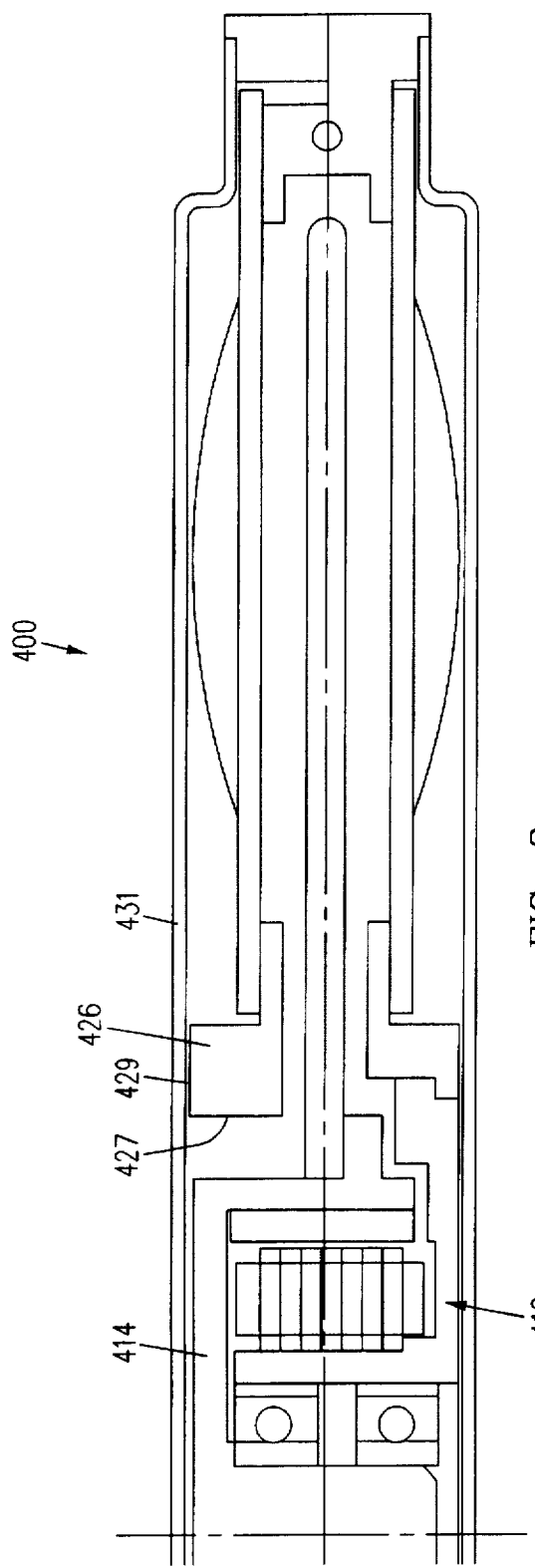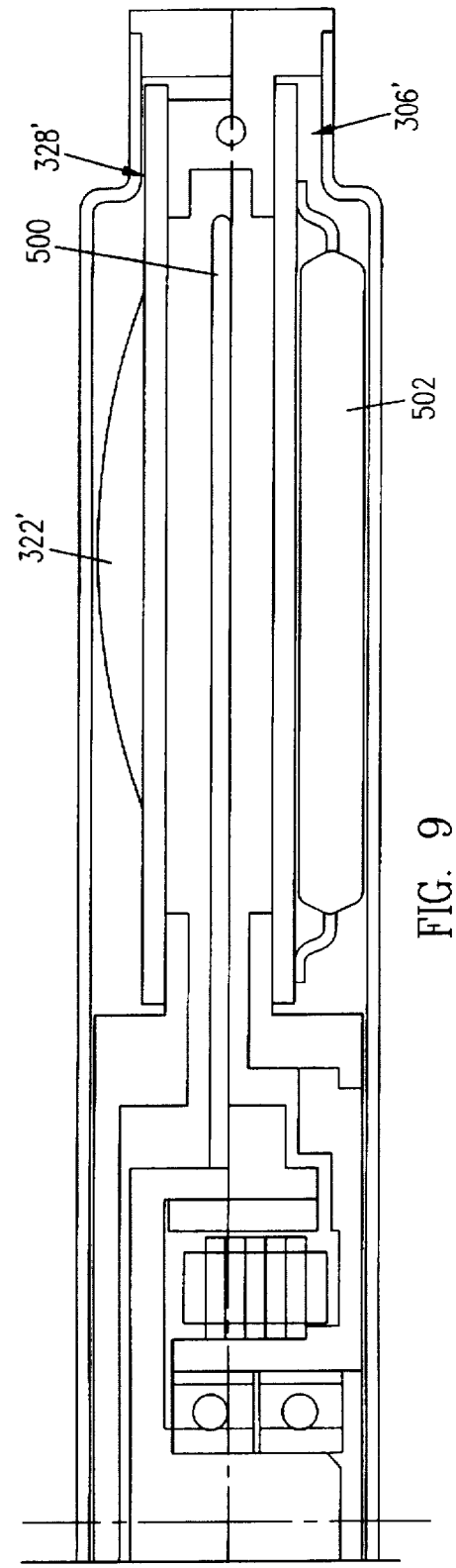

DISK DRIVE APPARATUS

This application is a continuation of application Ser. No. 08/270,694 filed Jul. 5, 1994, abandoned.

FIELD OF THE INVENTION

This invention relates to a disk drive apparatus usable in place of a memory card in a personal computer and, in particular, to a disk drive apparatus meeting the specifications established by the Personal Computer Memory Card International Association.

CROSS REFERENCE TO RELATED APPLICATION

The subject matter herein is related to that in U.S. patent application Ser. No. 07/958,858, filed Oct. 8, 1992, entitled "Mounting Arrangement for Disk Drive", invented by David M. Furay, and assigned to the assignee of this invention.

BACKGROUND OF THE INVENTION

Integrated circuit cards have become popular as a means of conveniently adding memory capacity to personal computers, particular palm top, lap top, and notebook-size computers, as well as other devices such as modems, serial ports, cellular phone links, facsimile machines, application read-only memories, and the like. To promote compatibility among memory cards, physical, interface and software standards have been adopted by the Personal Computer Memory Card International Association (PCMCIA) in the United States and by the Japan Electronics Industry Development Association (JEIDA). The current PCMCIA Card Standard Release 2.01, published November, 1992, which is incorporated herein by reference, provides for three physical sizes, designated Type I, Type II and Type III, which are distinguished from each other primarily by specifying card thicknesses of 3.3, 5.0, and 10.5 millimeters maximum respectively. The memory cards are provided with a 68-pin socket connector at one end and are typically guided into place by a pair of channel guides which engage the side edges of the card.

With the Type II card thickness of 5.0 millimeters maximum specified above, the possibility of substituting a small disk drive, having disks 1.8 inches in diameter, for example, in place of a solid state memory card would permit a substantially larger memory capacity, i.e., 100 megabytes, to be added to the host computer. Thus, the disk drive, in order to achieve this advantages, must have an appropriate thickness of, for example, 5.0 millimeters maximum to meet the Type II physical constraints.

Heretofore, while such disk drive apparatus have in the past been designed to be relatively thin (for example, as disclosed in the above-cited patent application 10–15 millimeters), it would be desirable to achieve a thickness on the order of 5.0 millimeters as described above.

FIG. 1 illustrates an exploded view of a disk drive apparatus 10 of the prior art. A base housing 100, which is preferably formed of aluminum, although plastic or steel may also be used, includes side rails 101 and 102.

Mounted to base housing 100 are a printed circuit board (PCB) 108 and a shield member 109, which includes an insulating layer 109A bonded to an ESD (Electrostatic Discharge) shield 109B. A set of contacts 110A on connector 105 are electrically bonded to opposing contacts 110B on PCB 108. A die cast aluminum cover 111 fits over the disks, actuator and other elements which are mounted on base housing 100 and is mounted to base housing 100 by means of four screws (not shown). The stacked assembly of base housing 100, PCB 108 and shield member 109 is held together by a set of screws 112 which are threaded into base housing 100.

As shown in prior art FIG. 2 (side section view), a spin motor assembly 200 is mounted into an aperture 114 in base housing 100. Spin motor assembly 200 includes a spindle 201 which protrudes through the aperture 114 and through aperture 116 in PCB 108. Spindle 201 has a pair of data disks 202 affixed thereto, both being positioned on one side of (above) the base housing 100. PCB 108 lies directly beneath base housing 100 and has attached to it integrated circuit components represented by 203A, 203B and 203C. Thus, printed circuit board 108 and its components, including components 203A–203C, are set in a cavity which is shielded by shield 109 on the bottom and base housing 100 on the top.

As shown and described the spin motor assembly passes through the aperture in the PCB 108 and the PCB 108 has the same overall configuration or "footprint" as the base housing 100. Furthermore, the PCB 108 and associated components 203A, 203B, 203C are outside the clean enclosure formed by the cover 111, and base housing 100.

A single disk prior art disk drive assembly of the type shown in FIG. 1 is designed to meet the PCMCIA Type III specification, with the total thickness not to exceed 10.5 millimeters. To achieve a total thickness of 5.0 millimeters or less in order to meet the Type II specification described above, reference is made to the preferred embodiments of the invention.

SUMMARY OF THE INVENTION

A disk drive apparatus in accordance with the present invention includes a unitary base structure which includes a base portion and a printed circuit board. The base portion and printed circuit board form an integral structure. The base structure has mounted thereto a spin motor assembly and an actuator. The cover for the base structure may be made up of a cover portion and a printed circuit board which together define a unitary cover structure, integrally formed by the cover portion and printed circuit board. Edge portions of the disk of the device extend into recesses in the side rails thereof.

Through use of the structure described above, an overall disk drive apparatus thickness of 5.0 millimeters maximum may be achieved, allowing substitution thereof for a memory card of overall thickness of 5.0 millimeters maximum.

DESCRIPTION OF THE DRAWINGS

FIG. 8 is an enlarged sectional view similar to that shown in FIG. 6. but of a modified portion of the apparatus of FIG. 7; and FIG. 9 is a sectional view similar to that shown in FIG. 6 but of another embodiment of the invention.

DESCRIPTION OF THE PREFERRED EMBODIMENTS

Figure 1:
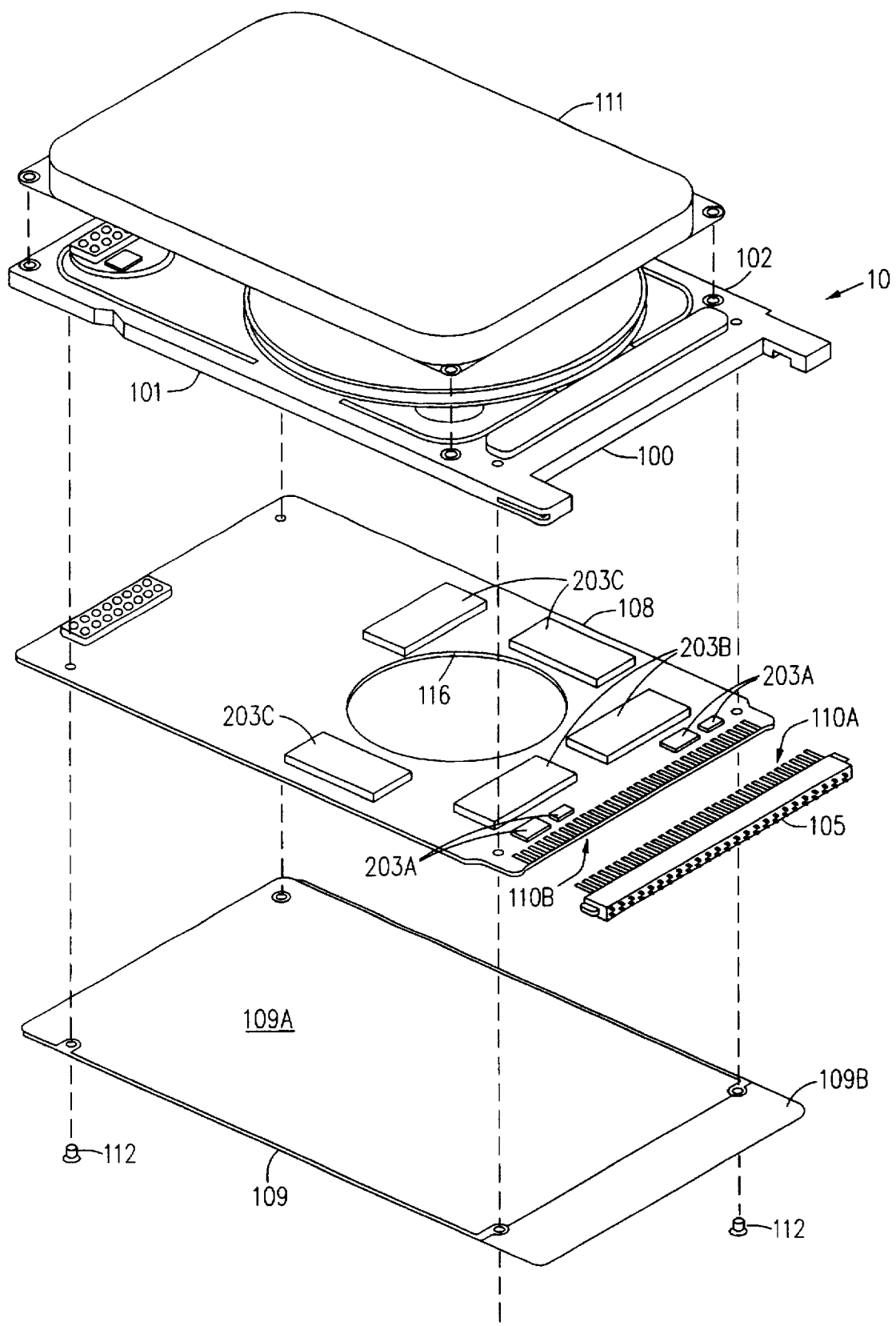
FIG. 1 illustrates a perspective exploded view of a prior art Type III PCMCIA disk drive apparatus.
Figure 2:
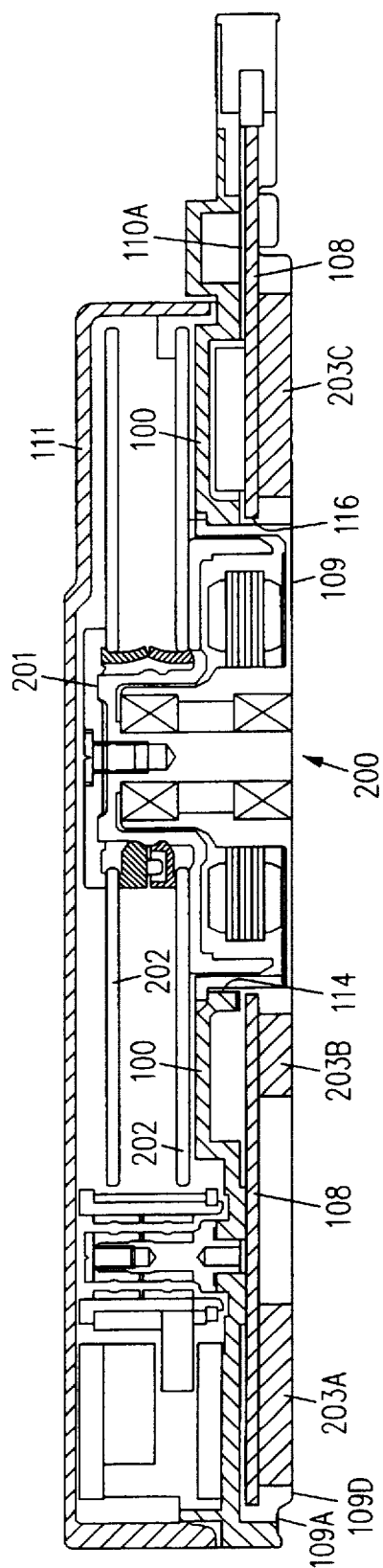
FIG. 2 is a sectional view of the prior art disk drive apparatus of FIG. 1.
Figure 3:
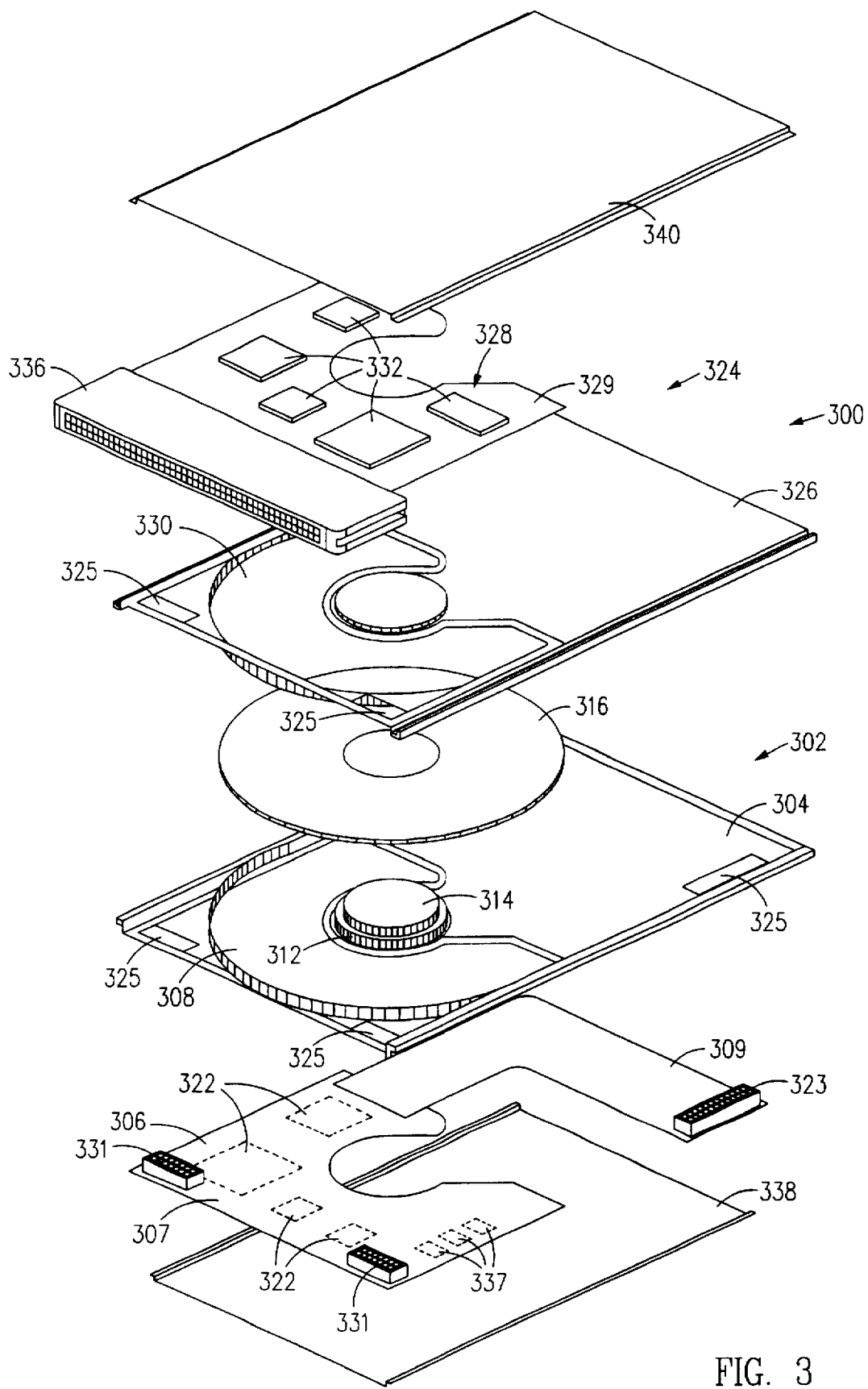
FIG. 3 is an exploded perspective view of a preferred embodiment in accordance with the invention.
Figure 4:
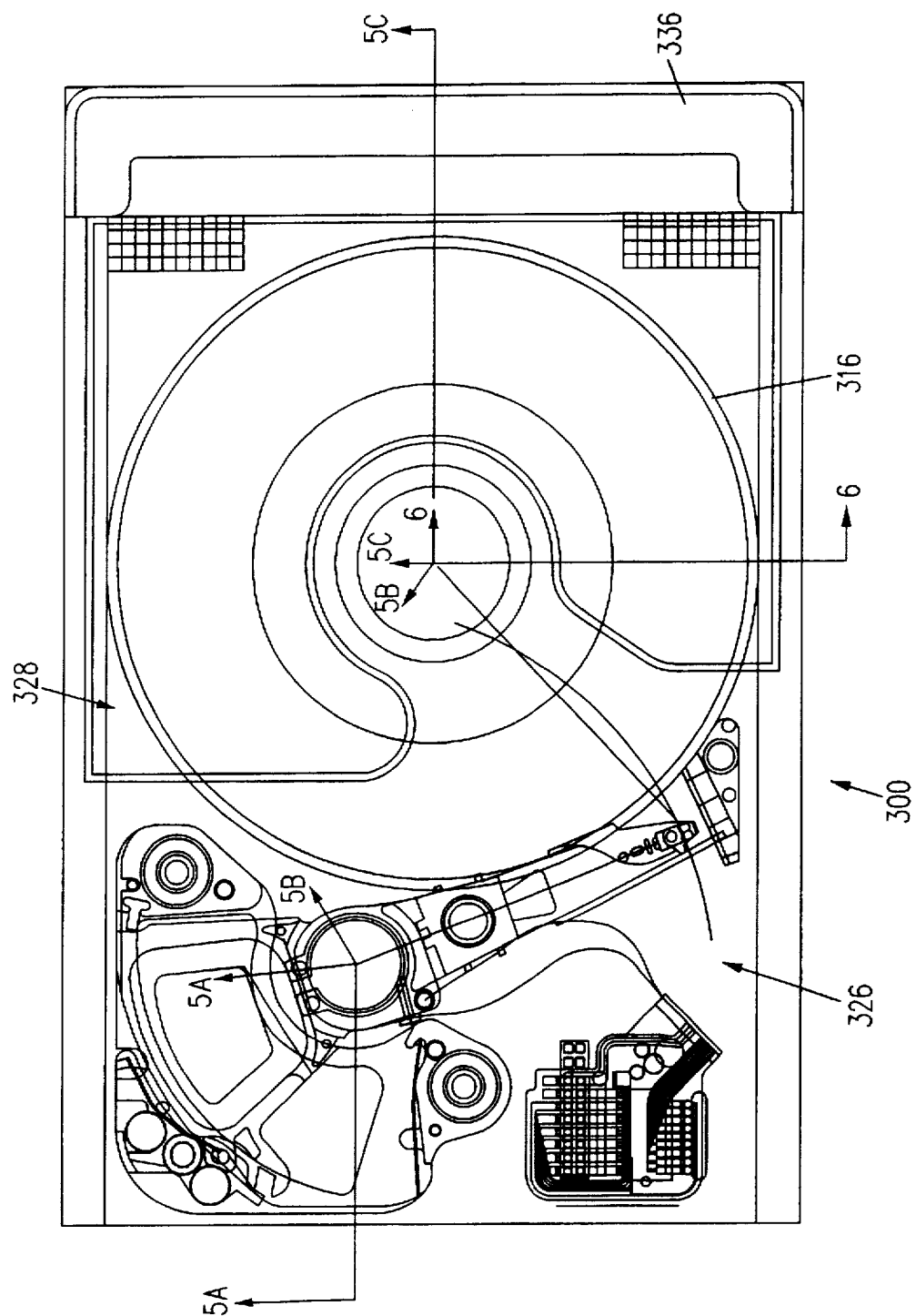
FIG. 4 is a plan view of the embodiment of FIG. 3.

As shown, and with reference to FIGS. 3–6, illustrated therein is an exploded view of the disk drive apparatus 300. A base structure 302 thereof is made up of a base portion 304, which is preferably formed of aluminum, although plastic or steel may also be used, and a printed circuit board 306 mounted thereto, for example, by means of bonding or other fastening means such as screws, rivets, clamps or the like. The printed circuit board 306 is made up of a board 307 and a number of integrated circuits 322 mounted thereto. The base portion 304 defines an opening 308 over which the printed circuit board 306 is mounted to the base portion 304, so that the printed circuit board 306 and base portion 304 together define a unitary, integrally formed, complete base structure 302.

A flex circuit 309 is included, connected to the printed circuit board 306.

The base portion 304 of the base structure 302 defines an aperture in which a spin motor assembly 312 is mounted. The spin motor assembly 312 includes a rotating spindle hub 314 to which data storage disk 316 is affixed. The base portion 304 further defines an aperture 318 in which a post 320 of an actuator bearing cartridge 321 is mounted by means of bonding, pressing, screws, rivets, clamps or the like.

The plurality of integrated circuits 322 (in this embodiment digital circuits such as interface controller, microprocessor, gate array, RAM (Random Access Memory), and/or flash ROM (Rear Only Memory)) are all mounted on one side of the board 307 (in the drawings, the bottom side thereof).

Further included is a cover structure 324 attachable to the base structure 302 by means of screws (not shown) and made up of a cover casting 326 and a printed circuit board 328. The printed circuit board 328 includes a board 329 and a plurality of integrated circuits 332 mounted thereto. The printed circuit board 328 fits over an opening 330 in the cover casting 326 and is fixed to the cover casting 326, for example, by bonding, and together the printed circuit board 328 and cover casting 326 define a unitary, integrally formed, complete cover structure 324.

All of the integrated circuits 332 (in this embodiment analog circuits such as read/write, spin servo, load/unload servo, and seek servo functions) are mounted on one side of the board 328 (in the drawings the top side thereof).

The apparatus 300 includes top and bottom conductive shield members 338, 340 mounted to and over the cover structure 324 and base structure 302 respectively by means of screws (not shown), to improve ESD and EMI (Electromagnetic Interference) shielding. These members 338, 340 could also be magnetically permeable for further magnetic and EMI shielding.

The size and shape of each printed circuit board 328, 306 is determined by the available unswept space as determined by the actuator assembly, that is, the package of mechanical components determines that the configuration of the printed circuit boards which can cooperate with the respective base and cover casting as described above.

Figure 6:
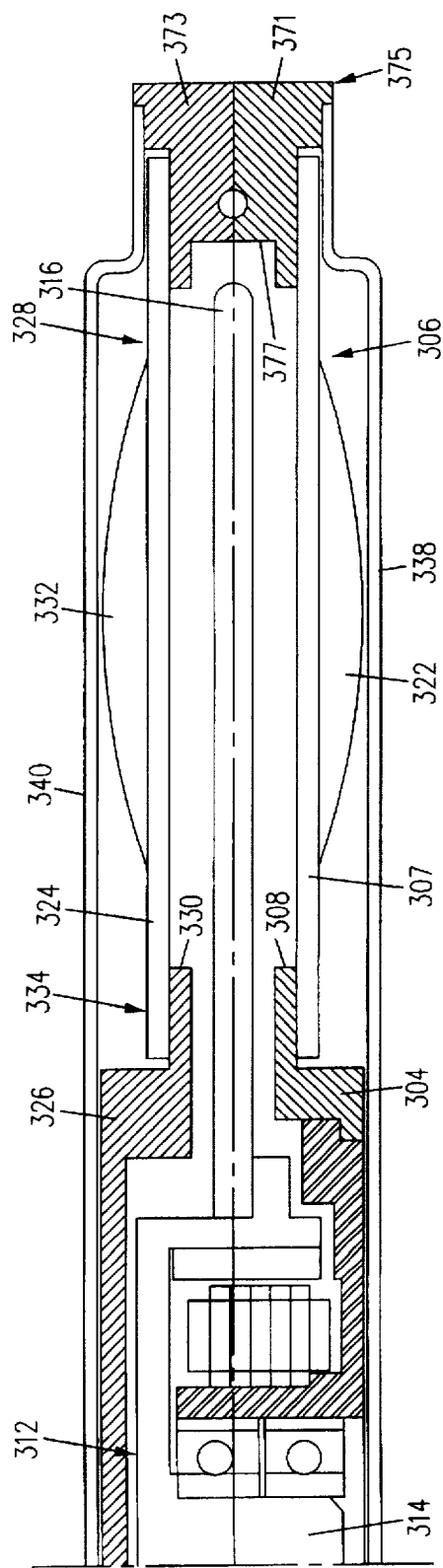
FIG. 6 is a sectional view taken along the line 6—6 of FIG. 4.

As best shown in FIG. 6, the board 306 and board 328 have respectively bonded thereto rail portions 371, 373 in turn defining rails 375 (one shown in FIG. 6), each rail 375 in turn defining an elongated recess 377 into which an edge portion of the disk 316 extends when the apparatus is in its assembled state. This configuration contributes to achieving a reduced thickness of the assembly, as compared to the system previously described wherein a disk or disks are on one side of the base housing defining the rails.

Figure 6A:
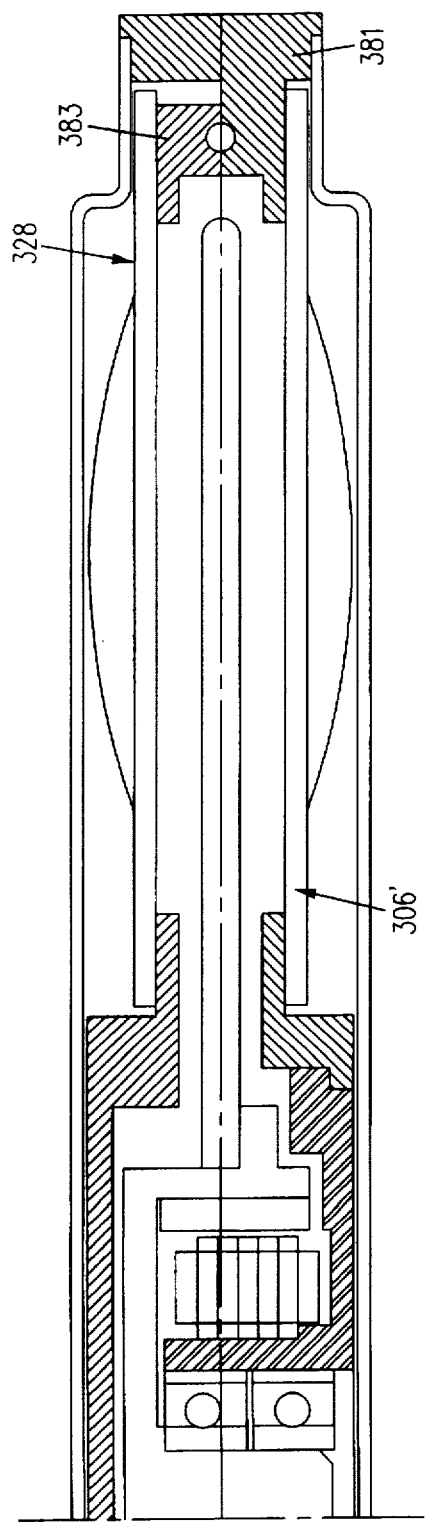
FIG. 6A is a sectional view similar to that shown in FIG. 6 but with overlapped joints at the rail.

FIG. 6A shows an alterative form of rail structure wherein a rail portion 381 is bonded to printed circuit board 306 and a rail portion 383 is bonded to printed circuit board 328. While the symmetrical rail structure of FIG. 6 provides a relatively direct EMI injection path, the labyrinth type structure of FIG. 6A reduces EMI injection.

Figure 5A:
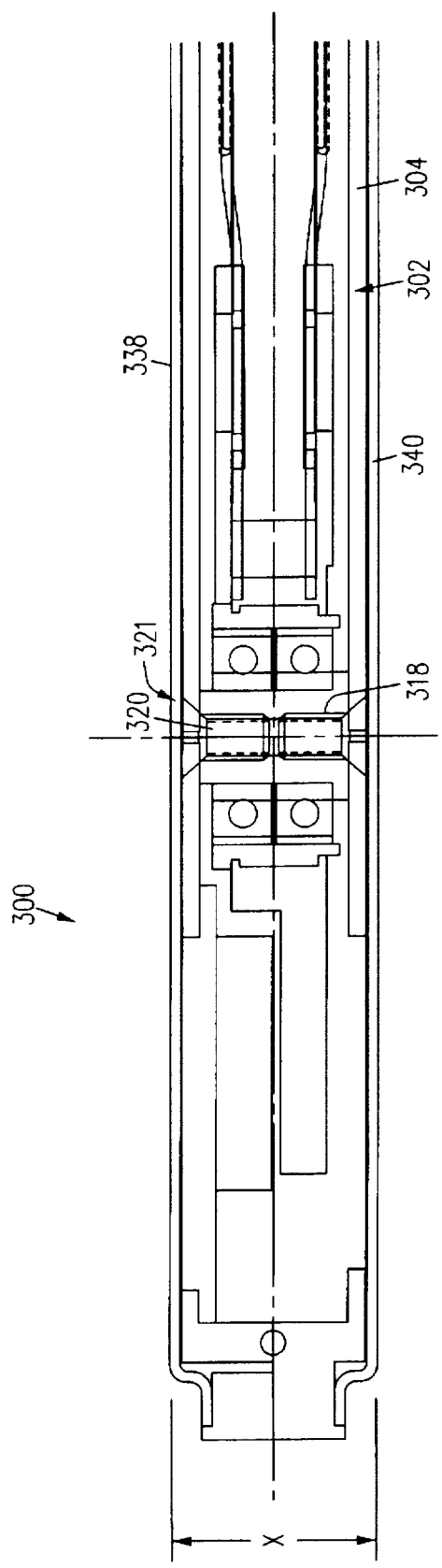
FIGS. 5A–5C are sectional views taken along the indicated lines of FIG. 4.
Figure 5B:
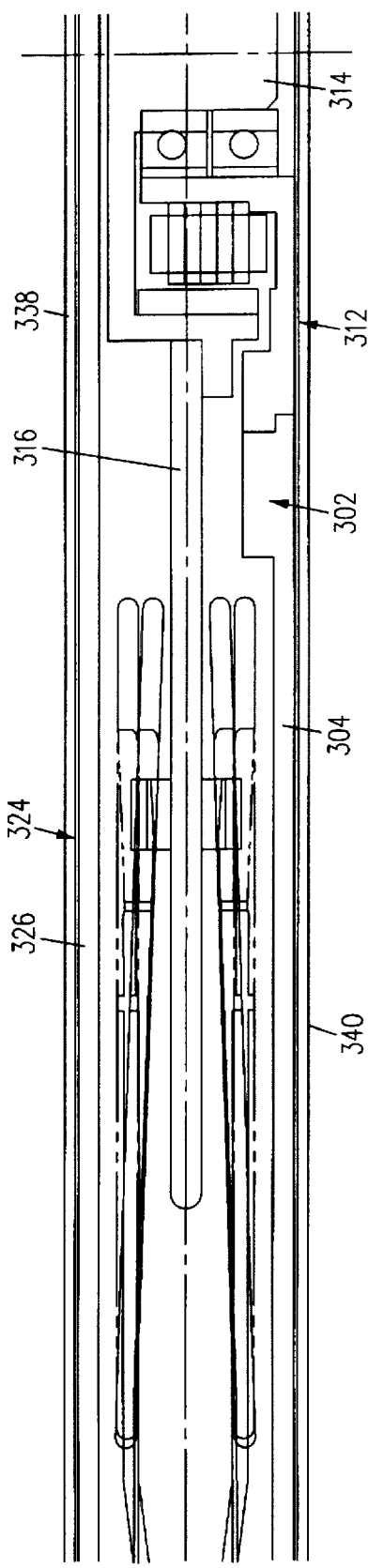
Figure 5C:
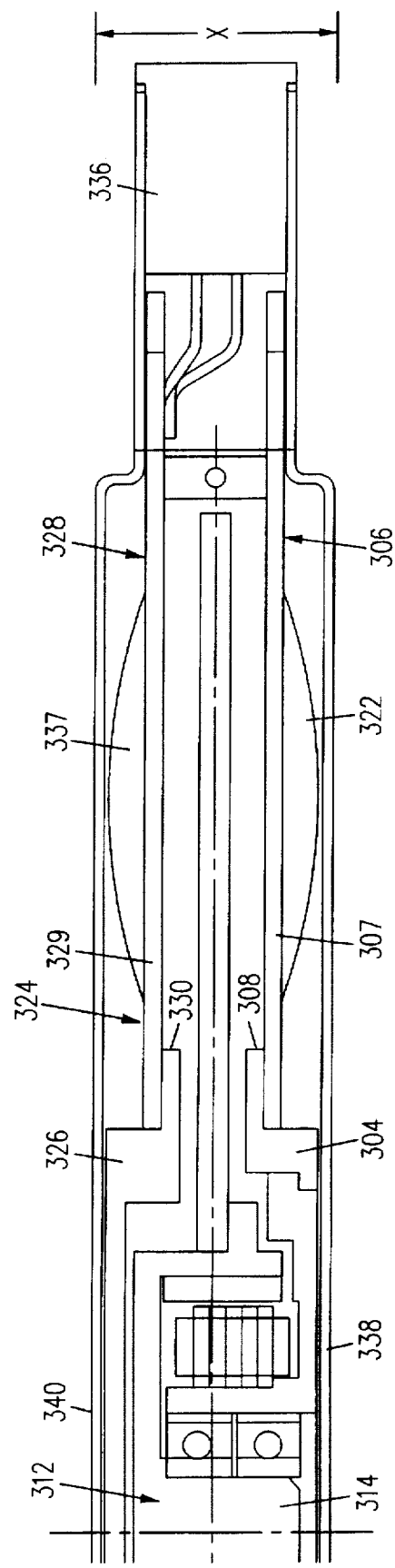

Referring to FIG. 5C, with the base structure 302 (made up of fitted-together base portion 304 and printed circuit board 306), and the cover structure 324 (made up of fitted-together cover casting 326 and printed circuit board 328) mounted together, and with the shield members 338, 340 in place, all as an integrated assembly, it will be noted that in accordance with the above description an overall reduced thickness of 5.0 mm (dimension X) is achieved. Additionally, with all integrated circuits of each printed circuit board on an "outward" side of the device relative to the disks and actuator assembly, the inner chamber defined by the base assembly and cover assembly is sealed so as to be compatible with Class 10 HDA (Head Disk Assembly) device interiors.

The printed circuit board 328 further includes a connector 336 for electrical connection to the components of the disk drive assembly 300. Appropriate connections are of course provided between all electrical components of the apparatus 300 and the connector 336 as needed, i.e., through PCB interconnect 331 (or alternatively through, for example, an elastomeric compression connector) and flex circuit interconnect 323, with appropriate passages 325 being provided in the base portion 304. By integrating (i) the cover casting and a printed circuit board, and (ii) the base portion and another printed circuit board, into an enclosed structure, the number of parts can be reduced and therefor overall thickness as well as tolerances can be reduced, i.e. with more parts dimensional errors (each within tolerance) can stack up. With fewer parts this is less of a problem, so tolerances of individual parts can be increased. Additionally, with fewer parts, each can as made thicker, resulting in more strength and stiffness of the device.

Figure 7:
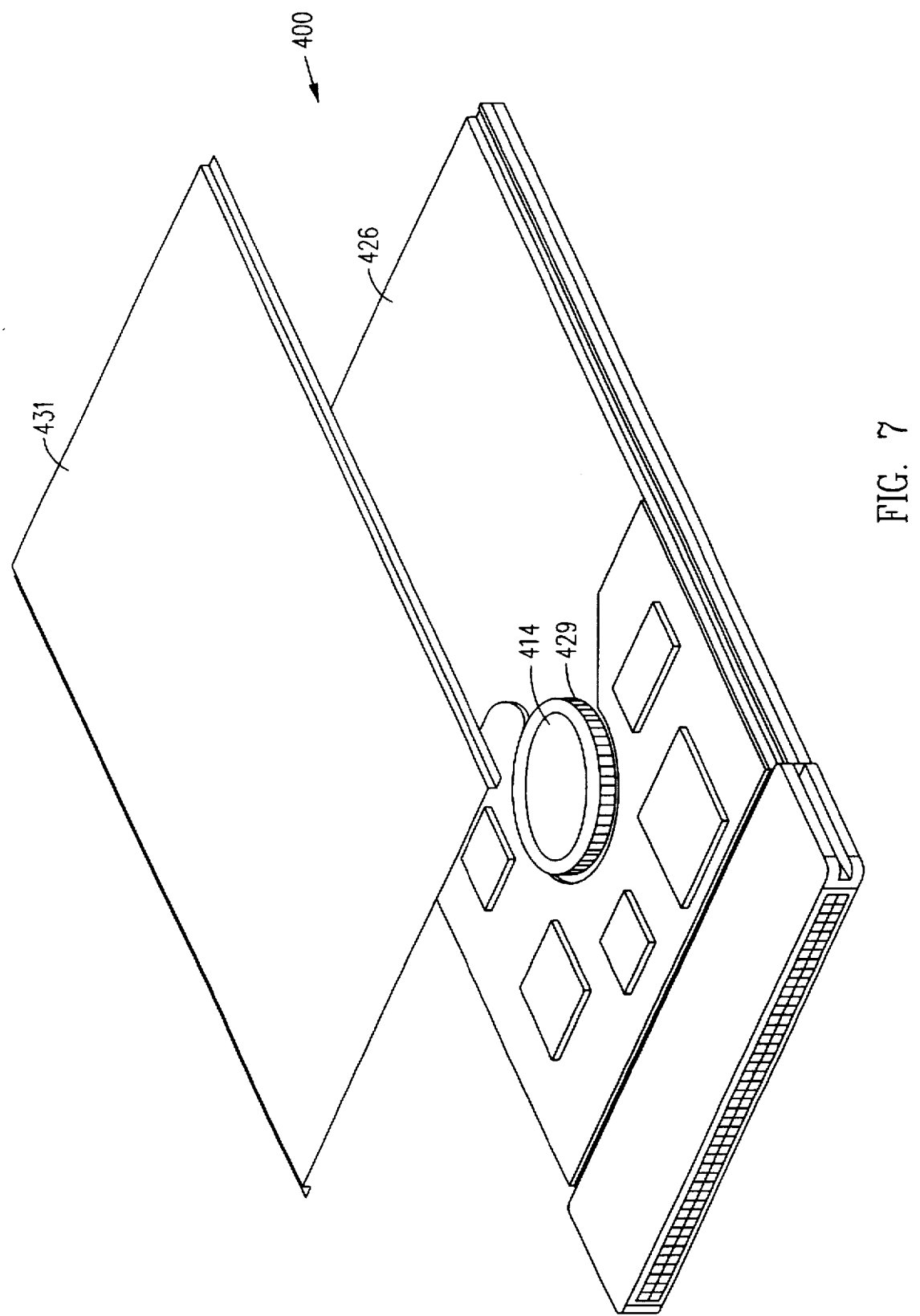
FIG. 7 is an exploded perspective view of a second embodiment of the invention.

Another embodiment 400 of the invention is shown in FIGS. 7 and 8. As shown therein, the cover casting 426 defines an aperture 427 therein. A portion of the spindle 414 of the spin motor 412 extends into this aperture 427, allowing an increase in motor height, so as to allow the lamination stack dimension of the motor 412 to be increased significantly, i.e., on the order of 40%. This change also increases the bearing stance of the motor, improving motor resonance. Meanwhile, the surface 429 of the cover casting seals with the bottom surface of the shield 431 with the shield 431 in place.

By providing a unitary, integrally formed base structure and an integrally formed cover structure as disclosed above, it has been found that an overall thickness of 5.0 millimeters for the entire device, including the shield members, is achieved. Thus, the Type II PCMCIA card standard recited above can be achieved, allowing substitution of such a disk drive assembly in place of a memory card, greatly enhancing memory capacity.

Alternatively, either the base structure or cover structure described above can be used, allowing a thinner disk drive assembly than in the prior art.

FIG. 9 shows a disk drive assembly wherein the disk 500 is offset when compared to the previous embodiment, allowing use of taller packaging of integrated circuits 502 (such as PLCC or QFP (Flat Package) on one side thereof as shown, while the other side uses COB (Chip on Board) or TAB (Tape Automated Bonding) or no electronics. Furthermore, the apparatus can be used with chip-on-board, die bonding and flip-chip technology.

It will also or understood that the present invention can be used with a multidisk structure.

We claim:

1. A disk drive apparatus comprising:
    a unitary base structure comprising:
        a base portion defining a first opening; and
        a first printed circuit board having a first side and a second side opposite to said first side, wherein said second side is attached to said base portion to cover said first opening thereby forming said unitary base structure;
    a unitary cover structure comprising:
        a cover portion defining a second opening; and
        a second printed circuit board having a first side and a second side opposite to said first side, wherein said second side is attached to said cover portion to cover said second opening thereby forming said unitary cover structure and further wherein said unitary cover structure is connected to said unitary base structure to define an inner chamber of said disk drive apparatus;

and a spin motor assembly mounted to said unitary base structure and disposed in said inner chamber.

2. The disk drive apparatus of claim 1 wherein the base portion and said first printed circuit board of the unitary base structure are bonded together.

3. The disk drive apparatus of claim 1 wherein the cover portion and said second printed circuit of the unitary cover structure are bonded together.

4. The disk drive apparatus according to claim 1 wherein said disk drive apparatus is approximately 5.0 mm. in thickness.

5. The disk drive apparatus of claim 1 wherein said spin motor assembly is mounted to said base portion.

6. The disk drive of claim 1 wherein at least one disk attached to said spin motor assembly rotates within said inner chamber.

7. A disk drive apparatus as in claim 1 wherein printed circuit board.

8. A disk drive apparatus as in claim 1 wherein components are mounted only on said first side of said second printed circuit board.

* * * * *